Figures 1, 2, 3, 4:
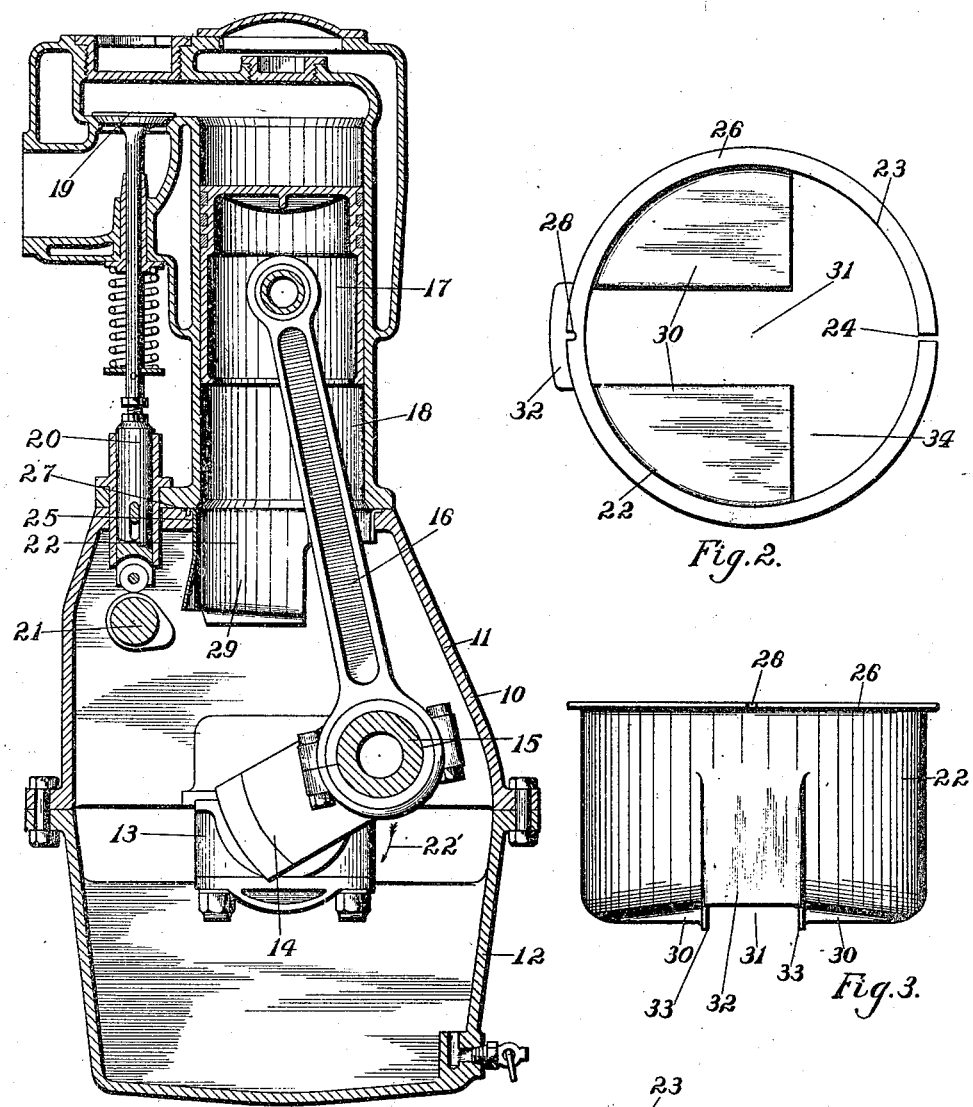

R. HUFF.
HYDROCARBON MOTOR.
APPLICATION FILED JULY 10, 1913.

1,181,312.

Patented May 2, 1916.

WITNESSES
Milo L. Bailey.
Clair J. Cote.

INVENTOR:
Russell Huff,
by Milton Tibbetts,
Attorney.

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,181,312.     Specification of Letters Patent.     Patented May 2, 1916.

Application filed July 10, 1913. Serial No. 778,316.

*To all whom it may concern:*

Be it known that I, RUSSELL HUFF, a citizen of the United States, and resident of Detroit, Wayne county, State of Michigan, have invented certain new and useful Improvements in Hydrocarbon-Motors, of which the following is a specification.

This invention relates to hydrocarbon motors, and particularly to means for preventing oil from splashing from the crank-case into the cylinder.

In most of the hydrocarbon motors used in motor vehicles, the cylinder walls and the auxiliary bearings and the cam-shaft within the crank-case are lubricated primarily by the splash of oil caused by the dipping of the cranks and connecting rods into the oil contained in the bottom of the crank-case or by the oil thrown from the connecting rod bearings and main crank-shaft bearings caused by the excess of oil supplied to these bearings under considerable pressure. In some cases, and particularly when the motor is idling, this causes an excess of oil to be thrown upon the cylinder walls and if the pistons are not quite as tight as they should be, more or less of the oil will be drawn into the combustion chamber of the piston by reason of the suction therein and it will be burned and expelled from the exhaust in the form of smoke. This is of course wasteful of oil and the smoking is objectionable and the interior of the motor receives an unnecessary deposit of carbon.

One of the objects of the present invention is to provide a baffle at the lower open end of the cylinder to prevent this excess of oil from reaching the cylinder walls. This baffle is preferably of such form that it extends somewhat below the lower end of the cylinder and surrounds the skirts of the piston when the latter is at the bottom of its stroke. The lower ends of the downwardly extending part of the baffle are formed with approximately horizontal flanges which prevent oil being splashed directly into the cylinder.

Another object of the invention is to provide a downwardly extending baffle in the crank-case on that side of the case in which the crank is moving on its up stroke, and as the cam-shaft is located in this side of the crank-case also, a further object is to form this baffle so that the oil will be splashed from it to the cam-shaft and its bearings.

Other objects of the invention will be seen from the following description taken in connection with the drawings, in which:

Figure 1 is a transverse sectional view through a motor embodying this invention; and Figs. 2, 3, and 4 are enlarged top, side, and vertical sectional views respectively of the baffle.

Referring to the drawings, 10 represents the motor crank-case formed in the present instance, in two parts, the upper part 11 of which forms the base of the motor, and the lower part 12 of which forms the sump or oil well of the motor. In this crank-case are the main bearings 13 which support the crank-shaft 14, from the crank pin 15 of which extends the connecting rod 16 which is operated by the piston 17 working in the cylinder 18 which is mounted upon and secured to the upper part 11 of the crank-case.

The cylinder shown is of the L type having puppet valves 19 at one side which valves are operated by push rods 20 from a cam-shaft 21 which is mounted in suitable bearings on the interior of the crank-case 10. The crank-shaft of the motor shown is adapted to operate in a "clockwise" direction, as shown by the arrow 22, so that the crank pin 15 is on the downward stroke in Fig. 1. With the crank moved 180 degrees from the position shown it will be on its up stroke, at which time it will have a tendency to splash oil from the bottom of the crank-case up into the cylinder. Also if oil is fed under pressure from the crank-shaft to the connecting rod bearing on the crank pin 15, the excess of oil will be thrown by centrifugal force tangentially from the path of travel of the crank pin, which would of course tend to throw the oil on to the side of the cylinder directly above the crank pin in the position in which it is shown in the drawings.

For the purpose of preventing too much oil from being splashed on to the piston and cylinder walls, a baffle 22 is arranged between the cylinder and crank-case. As shown, this baffle comprises a ring portion 25 split at 24 so that it may be sprung into place in the opening 25 which is concentrically arranged directly below the open end of the cylinder. This split ring has an annular flange 26 which is clamped between the cylinder and the crank-case, as shown in Fig. 1, and a pin 27 and a notch 28 in the flange 26 position the baffle properly so that it will not interfere with the connecting rod.

The ring portion of the baffle is extended downwardly into the crank-case on that side only of the case in which the crank is moving when on its up stroke, that is on the side of the crank-case opposite to that in which the crank pin 15 is located in Fig. 1. This downwardly extending portion or skirt 29 thus protects from oil splash the lower part of the piston when it is at the bottom of its down stroke and it also causes the oil splashed against it to be carried over onto the cam-shaft and its bearings so that they are sure of efficient lubrication.

The lower edges of the skirt 29 are provided with substantially horizontal flanges 30, as shown best in Fig. 2, these flanges leaving a transverse slot 31 between them for the passage of the connecting rod 16. In the form of the baffle shown, the part of the skirt 29 which is at one end of the slot 31 is bent outward slightly, as at 32, for the purpose of giving the connecting rod plenty of clearance. The inner edges of the flanges 30 may also be provided with down turned lips 33 and the flanges are also inclined slightly toward their free edges, so that any oil which runs down from the cylinder walls may quickly drain from the interior of the baffle into the crank-case.

The cut-away portion 34 of the baffle may be made larger or smaller as is desired to suit different conditions, the exact amount which the baffle is cut away at this point being determined by experiment.

The baffle shown is preferably stamped from sheet metal but it will of course be understood that it may be in the form of a casting or it may be otherwise built up.

It will also be understood that various modifications may be made from the details of the invention shown without departing from the spirit or scope of the claims.

Having thus described my invention, what I claim and desire to secure by Letters Patent is:

1. In a hydrocarbon motor, the combination with the crank case and the cylinder mounted thereon, of a cylindrical split baffle having a slot therein for the connecting rod, and means to hold said baffle against turning and against movement in the cylinder.

2. A cylinder baffle comprising a split ring having an extended skirt through approximately half its circumference only, and a bottom flange on said skirt having a slot, for the purpose described.

3. A cylinder baffle comprising a split ring having an extended skirt through approximately half its circumference only, and a bottom flange on said skirt having a slot, said flange being slightly inclined toward its free edge.

4. In a vertical hydrocarbon motor, the combination with the crank case, the crank shaft rotating therein, and a separately formed cylinder mounted on the crank case, of a baffle secured between the cylinder and crank case to prevent the lubricant splashing into the open end of the cylinder.

5. In a hydrocarbon motor, the combination with the crank case, the crank shaft rotating therein, and the cylinder mounted on the crank case, of a non-reciprocating baffle mounted in the open end of the cylinder and having a downwardly extending part arranged concentrically below the cylinder.

6. In a hydrocarbon motor, the combination with the crank case, the crank shaft rotating therein, the cylinder mounted on the crank case, the piston operating in the cylinder, and the connecting rod between the piston and crank shaft, of a baffle mounted at the joint between the cylinder and crank case and having a downwardly extending part adapted to protect the piston from oil when the piston is at the bottom of its stroke.

7. In a hydrocarbon motor, the combination with the crank case, the crank shaft rotating therein, the cylinder mounted on the crank case, the piston operating in the cylinder, the connecting rod between the piston and crank shaft, and the cam shaft mounted in the crank case at one side of the crank shaft, of a baffle mounted in the open end of the cylinder to protect the latter from oil splash and having a downwardly extending part at one side to throw the oil on to the cam shaft and its bearings.

8. In a hydrocarbon motor, the combination with the crank case, the crank shaft rotating therein, the cylinder mounted on the crank case, the piston, and connecting rod therefor, of a baffle extending from the open end of the cylinder into the crank case on that side of the case in which the crank is moving on the up stroke, said baffle being cut away on the other side and having flanges on the lower ends of its downwardly extending part leaving a slot between the flanges for the operation of the connecting rod.

9. In a hydrocarbon motor, the combination with the crank-case, the crank shaft rotating therein, the cylinder mounted on the crank case, the piston, and connecting rod therefor, of a baffle free from the piston and having a skirt extending into the crank case on that side of the case in which the crank moves on the up stroke.

10. In a hydrocarbon motor, the combination with the crank case, the cylinder mounted thereon, and the piston adapted to reciprocate in the cylinder, of a baffle free from the piston and having a skirt extending downwardly from the cylinder to protect the lower end of the piston while at the lower part of its stroke.

In testimony whereof I affix my signature in the presence of two witnesses.

RUSSELL HUFF.

Witnesses:
 LE ROI J. WILLIAMS
 J. B. BOYCE.